US 12,241,619 B2

(12) United States Patent
Oláh et al.

(10) Patent No.: US 12,241,619 B2
(45) Date of Patent: Mar. 4, 2025

(54) TILTABLE LUMINAIRE JOINT

(71) Applicant: Schreder S.A., Brussels (BE)

(72) Inventors: Gyula Oláh, Budapest (HU); Csaba Horvath, Budapest (HU); János Péter Szügyi, Mako (HU); Peter Balázs Bedo, Budapest (HU)

(73) Assignee: Schreder S.A., Brussels (BE)

( * ) Notice: Subject to any disclaimer, the term of this patent is extended or adjusted under 35 U.S.C. 154(b) by 0 days.

(21) Appl. No.: 18/432,709

(22) Filed: Feb. 5, 2024

(65) Prior Publication Data

US 2024/0175568 A1    May 30, 2024

Related U.S. Application Data

(63) Continuation of application No. 17/421,262, filed as application No. PCT/EP2020/050229 on Jan. 7, 2020, now Pat. No. 11,920,769.

(30) Foreign Application Priority Data

Jan. 7, 2019   (NL) ..................................... 2022347

(51) Int. Cl.
*F21V 21/30*    (2006.01)
*F16C 11/10*    (2006.01)
(Continued)

(52) U.S. Cl.
CPC ............ *F21V 21/30* (2013.01); *F16C 11/103* (2013.01); *F16M 11/10* (2013.01);
(Continued)

(58) Field of Classification Search
CPC ...... F21V 21/30; F21V 21/116; F16C 11/103; F16M 11/10; F16M 13/022; F21S 8/085
See application file for complete search history.

(56) References Cited

U.S. PATENT DOCUMENTS

| 5,515,744 A * | 5/1996 | Liao ....................... B62K 21/16 403/373 |
| 11,371,681 B2 * | 6/2022 | Wang ...................... F21V 17/12 |

(Continued)

FOREIGN PATENT DOCUMENTS

CN            201416854 Y      3/2010

OTHER PUBLICATIONS

PCT International Search Report and Written Opinion, Application No. PCT/EP2020/050229, mailed Feb. 20, 2020, 11 pages.

*Primary Examiner* — Tracie Y Green
*Assistant Examiner* — Michael Chiang
(74) *Attorney, Agent, or Firm* — McDonnell Boehnen Hulbert & Berghoff LLP

(57) ABSTRACT

Example embodiments relate to tiltable luminaire joints. One example tiltable joint for a luminaire includes a first joint portion that includes a joint member provided with an outer cylindrical surface section having an axis and opposing bearings aligned with said axis. The outer cylindrical surface section being provided with a first plurality of interengaging surfaces. The tiltable joint also includes a second joint portion that includes a joint housing provided with a pair of axially-aligned receiving surfaces, and an inner cylindrical surface provided with a second plurality of interengaging surfaces configured to interengage the first plurality of interengaging surface. The joint member of the first joint portion is configured for being housed within the joint housing of the second joint portion. Further, the tiltable joint includes first and second shaft portions that extend in alignment with the pair of axially-aligned bearings. Additionally, the tiltable joint includes a fixation means.

20 Claims, 6 Drawing Sheets

(51) Int. Cl.
*F16M 11/10* (2006.01)
*F16M 13/02* (2006.01)
*F21S 8/08* (2006.01)
*F21V 21/116* (2006.01)
*F21W 131/103* (2006.01)

(52) U.S. Cl.
CPC ........... *F16M 13/022* (2013.01); *F21S 8/085* (2013.01); *F21V 21/116* (2013.01); *F16C 2362/00* (2013.01); *F21W 2131/103* (2013.01)

(56) References Cited

U.S. PATENT DOCUMENTS

| | | | |
|---|---|---|---|
| 11,920,769 B2 * | 3/2024 | Oláh et al. | F16C 11/04 |
| 2014/0085909 A1 * | 3/2014 | Ahn | F21S 8/086 |
| | | | 362/382 |
| 2014/0105670 A1 * | 4/2014 | Plomteux | F16C 11/103 |
| | | | 403/83 |

* cited by examiner

TILTABLE LUMINAIRE JOINT

CROSS-REFERENCE TO RELATED APPLICATIONS

The present application is continuation of U.S. application Ser. No. 17/421,262, filed Jul. 7, 2021; which is a national stage entry of PCT/EP2020/050229, filed Jan. 7, 2020; which claims priority to NL 2022347, filed Jan. 7, 2019; the contents of each of which are hereby incorporated by reference.

FIELD OF INVENTION

The present invention relates to joints for luminaires. Particular embodiments of the invention relate to a luminaire joint which is tiltable.

BACKGROUND

Usually, lighting apparatuses are used to illuminate areas presenting various characteristics. Depending on these characteristics the lighting apparatus will be chosen and adjusted to obtain a desired lighting pattern on the ground to be illuminated. One of the important characteristics of the lighting apparatus will be its application, e.g. pedestrian road, highway, one-way road, etc. Another important characteristic is the support the lighting apparatus will be attached to. Indeed the type of support, its height, and its position with respect to the surface to be illuminated, will directly influence the lighting pattern obtained. Having joints linking lighting apparatuses, e.g. luminaire heads, and supports corresponding to all these situations would be costly, time consuming, and would require extensive stock keeping. It would therefore be advantageous to be able to design a joint for luminaire with a more adaptive approach whose relative positioning of the lighting apparatus with respect to the support can be modified, on site and/or at the factory, depending on the application and the desired light distribution.

Several solutions exist for adjustable joints for lighting apparatuses. Certain joints allow rotation, or use a fastener to limit the lighting apparatus position. However, these joints are either mechanically complex, which renders the joint design expensive, or have limiting features in terms of range, accuracy of the positioning, or sealing. Thus, there is a need for a luminaire joint which can be reliably adjusted, has a dependable mechanism, and optionally overcomes the drawbacks associated with existing joints for lighting apparatuses.

SUMMARY

The object of embodiments of the invention is to provide a luminaire joint which can provide a precise positioning with a reliable adjustment of its mechanism, such that a lighting apparatus provided to the luminaire joint is more adaptable to a site to be illuminated and/or to a specific application. More in particular, embodiments of the invention aim to provide a luminaire joint whose positioning can have a variable angle through a stable mechanism.

According to a first aspect of the invention, there is provided a tiltable joint for a luminaire. The tiltable joint comprises:
 a first joint portion comprising a joint member provided with an outer cylindrical surface section having an axis and opposing bearings aligned with said axis, said outer cylindrical surface section being provided with a first plurality of interengaging surfaces;
 a second joint portion comprising a joint housing provided with a pair of axially-aligned receiving surfaces, and an inner cylindrical surface provided with a second plurality of interengaging surfaces configured to interengage the first plurality of interengaging surfaces;
 wherein the joint member of the first joint portion is configured for being housed within the joint housing of the second joint portion, and the axis of the pair of axially-aligned bearings is substantially parallel to the axis of the pair of axially-aligned receiving surfaces;
 a first and second shaft portions extending in alignment with the pair of axially-aligned bearings, such that a pivot axis is defined;
 a fixation means configured for:
  fixing the first and second shaft portions to the second joint portion;
  enabling the engagement of at least a portion of the first plurality of interengaging surfaces with at least a portion of the second plurality of interengaging surfaces;
  enabling the release of said engagement such that a rotation movement of the joint housing relative to the joint member is enabled with respect to the pivot axis defined by the first and second shaft portions.

A common solution to adjust the angular positioning of a luminaire joint is to directly fasten together the engaging elements responsible for the adjustment. However, it creates constraints in the design of the joint which are not circumvented without drawbacks such as poor accuracy of the positioning, or limited range of adjustment between the support and the lighting apparatus. This problem is overcome by a tiltable joint for luminaire as defined above.

The first and second joint portions are designed such that the second joint portion partially houses the first joint portion. Having a partial housing for the joint increases the protection of the adjustment mechanism. Not only the adjustment mechanism will have additional protection, but the complementary areas of the first joint portion and the overlying second joint portion will be suitable for implementing contact surfaces between the joint portions. This available contact area may be used to design a sizable set of interengaging surfaces, which provides mechanical stability and a broad adjustment range. Moreover the overall cylindrical shapes of the joint portions are well adapted to a rotation of the first joint portion within the second joint portion for an uncomplicated tilt of the joint.

The first and second joint portions are joined or released from each other through the action of a first and second shaft portions and fixation means. The first and second shaft portions extending in alignment with the longitudinal axis of the first joint portion serve as a support for the fixation means which is fastened to the second joint portion. Due to the coaxial design of the cylindrical shapes of the first and second joint portions, the engaging force exerted by the combined use of the first and second shaft portions and the fixation means is directed towards the central axis of the cylindrical shapes. The engaging force, thus, reliably engages the second joint portion to the first joint portion for a stable positioning.

Preferred embodiments relate to a tiltable joint for an outdoor luminaire. By outdoor luminaire, it is meant luminaires which are installed on roads, tunnels, industrial plants, stadiums, airports, harbors, rail stations, campuses, parks, cycle paths, pedestrian paths, or in pedestrian zones for example, and which can be used notably for the lighting of an outdoor area, such as roads and residential areas in the public domain, private parking areas and access roads to private building infrastructures, etc.

According to an exemplary embodiment, a shaft comprises the first and second shaft portions, or a first and second shafts comprise the first and second shaft portions, respectively.

In this way, the first and second shaft portions are linked in one piece extending at least between the pair of axially-aligned bearing, optionally extending between the pair of axially-aligned receiving surfaces. Alternatively, the first and second shafts portions may be comprised by two shafts to be more adaptable.

According to a preferred embodiment, the first and second pluralities of interengaging surfaces are a first and second pluralities of interengaging teeth.

In this manner, the amount of contact surfaces is increased per surface area. In an embodiment, the first and second pluralities of interengaging teeth extend along the main axis of the joint member and of the joint housing, which forces the alignment during the engagement. The extent of the plurality of interengaging teeth, their contact surfaces, and the adjustment precision of the first joint portion with respect to the second joint portion can be conveniently customized through the design of the teeth. In other embodiments, the first and second pluralities of interengaging surfaces may be interengaging conical elements perpendicular to the cylindrical surfaces, rough surfaces configured for producing a predetermined friction when engaged, three-dimensional elements, and the like. Depending on the characteristics of the interengaging surfaces, the angular adjustment has a different precision. It may be an adjustment in steps, or step-less, preferably an adjustment in 5°-steps, more preferably an adjustment in 2.5°-steps.

According to an exemplary embodiment, the second joint portion is configured for being positioned in a first position of a plurality of positions with respect to the first joint portion, wherein the fixation means is configured for being unfastened to allow the second joint portion to be positioned from the first position to a second position of the plurality of positions with respect to the first joint portion, and wherein the fixation means is further configured for being fastened to prevent a movement of the second joint portion from the second position of the plurality of positions with respect to the first joint portion.

In this way, the release of the fixation means allows the rotation of the second joint portion with respect to the first joint portion for repositioning the tiltable luminaire joint. The fixation means inhibits a radial movement of the second joint portion with respect to the first joint portion when fastened. Unfastening the fixation means may be achieved such that the first and second joint portions are still attached while their respective interengaging surfaces are freed from contact. Since the first and/or second shaft portion is able to rotate freely with respect to the first joint portion, the second joint portion may be positioned from a first to a second position of a plurality of positions without having to detach the first and second joint portions. The interengaging surfaces may be defined as a plurality of surfaces having different angular positioning with respect to each other and conceived to cooperate with another corresponding plurality of surfaces. The interengaging surfaces may comprise straight and/or curved surfaces and have a desired roughness. They may be integrally formed with the first and second joint portions or fixed to them, and be made of e.g. metal or plastic, preferably in metal, more preferably in aluminum.

In a preferred embodiment, the joint is mounted to a support and provided with a luminaire head and gravity maintains the engagement of the interengaging surfaces of the first and second joint portions when unfastening the fixation means. The luminaire head may be lifted by an operator to enable the repositioning of the second joint portion with respect to the first joint portion.

According to a preferred embodiment, the fixation means extends radially with respect to the pivot axis defined by the first and second shaft portions and is configured for fixing the first and second shaft portions. The fixation means extends through the first and second shaft portions.

In this manner, the engaging force exerted by the combined use of the first and second shaft portions and the fixation means is substantially perpendicular to the central axis of the cylindrical surfaces of the first and second joint portions. It decreases the risk of slippage between the first and second joint portions when engaged since scissoring forces are minimized.

According to an exemplary embodiment, the first and/or second shaft portion comprises a landing opposite the axially-aligned receiving surface, and the fixation means is further configured for enabling the engagement by bringing the landing closer to the receiving surface.

In this way, the fixation means has a flat support in a plane substantially parallel to the shaft axis upon which it can exert a force. Due to the orientation of the landing, a radial force may be more efficiently applied with respect to the pair of axially-aligned receiving surfaces. The first and second shaft portions may both comprise a landing such that the engaging force is applied uniformly on either side of the first and second joint portions. As the fixation means is unfastened and the second joint portion rotated with respect to the first joint portion, the axial shaft may be rotated such that each landing has a fixed orientation with respect to the second joint portion. The pair of axially-aligned receiving surfaces enhances the position of the second joint portion with respect to the first and second shaft portions to improve the alignment of the first and second joint portions. An accurate coaxial alignment improves the precision of the joint positioning and the efficiency of the engaging force.

According to a preferred embodiment, the fixation means comprises at least one bolt configured for being provided through an aperture of the first and/or second shaft portions, and configured for being fastened to the joint housing of the second joint portion.

In this manner, the fixation means is achieved through a standard and reliable way. The aperture in the first or second shaft portion forms a guide for the bolt and will be coaxial with the engaging force direction. Preferably there is an aperture in both the first and second shaft portions and a bolt for each shaft portion. The aperture may be perpendicular to the axis of the shaft portion. In one embodiment the bolt head may be supported by the at least one landing. The bolt may be fastened to an integral nut portion comprised in the joint housing or to a nut provided to a supporting surface of the joint housing opposite the shaft portion. In yet another embodiment, the bolt is being provided through an aperture of the joint housing and is configured for being fastened to a nut integrally formed to the shaft portion or to a nut supported by the shaft portion. In still another embodiment, the bolt is a stud bolt fastened to nuts on either side.

According to an exemplary embodiment, the engagement of the at least portion of the first plurality of interengaging surfaces and the at least portion of the second plurality of interengaging surfaces is enabled over at least a 90°-arc, preferably over at least a 180°-arc, more preferably over at least a 300°-arc, most preferably over at least a 140°-arc, of the inner cylindrical surface of the second joint portion. In an exemplary embodiment, the tiltable joint 1000 may be configured for being adjusted from −10° to 120°, preferably from −10° to 30°, in a post-top configuration of the luminaire head, and for being adjusted from −100° to 30°, preferably from −30° to 30°, in a side-entry configuration of the luminaire head.

In this way, the luminaire joint is adaptable to a wide angular range. In one embodiment, the angular range of the interengaging surfaces is smaller on the first joint portion than on the second joint portion. In another embodiment, the angular range of the interengaging surfaces is larger on the first joint portion than on the second joint portion. In yet another embodiment the angular range of the interengaging surfaces is substantially equal on the first and second joint portions. In the latter embodiment, the increased amount of interengaging surfaces in contact may improve the mechanical stability of the joint positioning. The interengaging surfaces may be provided over one area, preferably centrally positioned, of the first and second joint portions. Alternatively, the interengaging surfaces may be provided to two or more areas of the first and second joint portions. In an exemplary embodiment, the interengaging surfaces may be provided over a first and second areas, said first area enabling positioning of the second joint portion with respect to the first joint portion over a first sub-range of the total positioning angular range, and said second area enabling positioning over a complementing second sub-range of the total positioning angular range, optionally overlapping the range of the first sub-range.

According to a preferred embodiment, the tiltable joint further comprises an angular indicator on at least one of the first joint portion, the second joint portion, or the first and/or second shaft portion.

In this manner, the joint may be reliably and precisely arranged in an adequate position of the plurality of positions in order to obtain a desired angular orientation of the associated luminaire head. The angular indicator may comprise letters, numbers, and/or a scale associated with the plurality of predetermined positions. Optionally, the tiltable joint may comprise a first angular indicator configured for indicating an angular positioning in a post-top configuration of the luminaire head, and a second angular indicator configured for indicating an angular positioning in a side-entry configuration of the luminaire head.

According to an exemplary embodiment, one of the first or second plurality of interengaging surfaces extends over an angular arc larger than the other one of the first or second plurality of interengaging surfaces.

In this way, one of the first or second plurality of interengaging surfaces provides for the entire angular range of positions and the other one of the first or second plurality of interengaging surfaces may be designed to achieve an adequate mechanically stable engagement of the first and second joint portions. The angular range of positions is maximized on one of the first or second joint portion while reducing the area provided with interengaging surfaces on the other one of the first or second joint portion. Space may be saved which increases the compactness of the tiltable joint.

According to a preferred embodiment, the first plurality of interengaging surfaces extends along at least two parallel rows of interengaging surfaces, and the second plurality of interengaging surfaces extends along at least two corresponding parallel rows of interengaging surfaces.

In this manner, the positioning of the second joint portion with respect to the first joint portion may be spread more evenly over the width of the joint member and joint housing as seen along their main axis direction. Preferably the two parallel rows are located substantially on the end portions of the joint member and joint housing. The spread of interengaging surfaces along two rows may free space in the central portions of the first and second joint portions for additional functionalities, e.g. a passage for electrical connection.

According to an exemplary embodiment, the first joint portion further comprises a mounting structure configured for mounting the first joint portion to a base support.

In this way, the mounted first joint portion has a fixed angle with respect to the base support and the joint can connect the luminaire head, mounted to the second joint portion, and the base support, thereby forming a luminaire. In another exemplary embodiment, the second joint portion is integrally formed as part of a housing of the luminaire head. The skilled person will understand that the first and second joint portions may be utilized interchangeably and that the second joint portion may comprise the mounting structure for mounting the second joint portion to the base support.

According to a preferred embodiment, the tiltable joint further comprises a passage for a connecting means between the first joint portion and the second joint portion.

In this manner, the connecting means may be wired through the joint. The wiring is generally passing through a central cavity of the base support. The passage allows maintaining the wiring within a protected enclosure to be connected to the luminaire head. The passage is preferably located in a central portion of the first joint portion such that it is protected by the overlying joint housing of the second joint portion.

According to an exemplary embodiment, the outer cylindrical surface section of the first joint portion is provided with an opening creating said passage.

In this way, the tiltable joint is adapted for maintaining the connection of the connecting means. The opening may be positioned such that it is covered by the joint housing of the second joint portion in the plurality of positions. In one embodiment, the opening may extend in a direction perpendicular to the axis of the cylindrical surface of the joint member to accommodate for the movement of the connecting means across the range of plurality of positions. The extent of the connecting means may be adapted to enable for its travel from the closest position of the luminaire head from the opening when attached to the joint, to its furthest position.

According to a preferred embodiment, the tiltable joint further comprises another fixations means configured for fixing the second joint portion to the first joint portion.

In this manner, the second joint portion may be further secured with respect to the first joint portion which improves the strength of the mechanical link between the first and second joint portions. The another fixation means, e.g. screw, bolt, rope, may be configured for being fastened to the first joint portion from outside the tiltable joint to enhance the safety of the engagement and against risk of slippage.

The skilled person will understand that the hereinabove described technical considerations and advantages for tiltable joint embodiments also apply to the below described corresponding luminaire system assembly, mutatis mutandis.

According to another aspect of the invention, there is provided a luminaire system assembly. The luminaire system assembly comprises:
- a base support;
- a tiltable joint for a luminaire as previously described;
- a luminaire head;
- wherein the tiltable joint is configured for connecting the base support and the luminaire head.

In this manner, the tiltable joint may be connected to a base support such as a luminaire pole to form a luminaire. The tiltable joint may be utilized to orient the luminaire head with respect to the base support to achieve an appropriate lighting pattern on a surface to be illuminated. Typical examples of luminaires are street lights. In other embodiments, the base support may be connected to a wall or another surface, e.g. for illuminating buildings or tunnels. Part of the tiltable joint may be included in a housing of the luminaire head or may be connected to the luminaire head in any manner known to the skilled person. The part of the tiltable joint connected to the luminaire head may be interchangeably the first joint portion or the second joint portion, preferably the second joint portion.

According to an exemplary embodiment, the base support comprises a support pole.

BRIEF DESCRIPTION OF THE FIGURES

This and other aspects of the present invention will now be described in more detail, with reference to the appended drawings showing a currently preferred embodiment of the invention. Like numbers refer to like features throughout the drawings.

DESCRIPTION OF THE FIGURES

Figure 1:
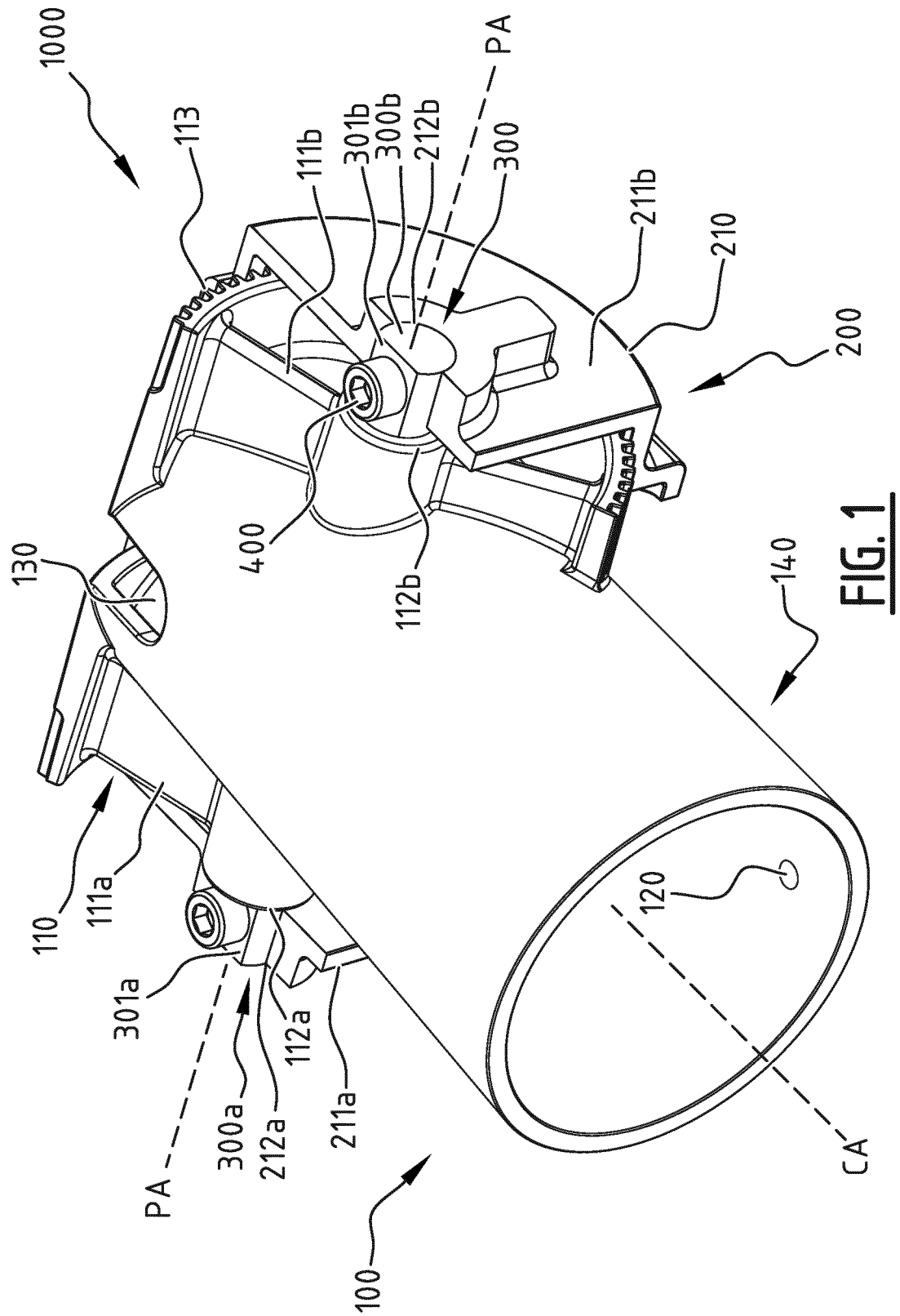
FIG. 1 shows a perspective view of an exemplary embodiment of a tiltable joint for a luminaire.

FIG. 1 shows a perspective view of an exemplary embodiment of a tiltable joint for a luminaire according to the present invention. The tiltable joint for a luminaire comprises a first joint portion 100, a second joint portion 200, a first and second shaft portions 300a, 300b, and a fixation means 400. Part of the tiltable joint 1000 of FIG. 1 may be included in a housing of a luminaire head or may be connected to the luminaire head in any manner known to the skilled person. The part of the tiltable joint 1000 connected to the luminaire head may be interchangeably the first joint portion 100 or the second joint portion 200, preferably the second joint portion 200. The tiltable joint 1000 may be connected to a base support such as a luminaire pole to form a luminaire. Typical examples of luminaires are street lights or sport lights. In other embodiments, the tiltable joint 1000 may be connected to a wall or another surface, e.g. for illuminating buildings or tunnels.

As illustrated in FIG. 1 the first joint portion 100 comprises a joint member 110 provided with an outer cylindrical surface section having an axis of rotation PA and opposing bearings 112a, 112b aligned with said axis PA. The joint member 110 may be connected to a connecting member 140 extending in a direction CA substantially perpendicular to the axis PA of the joint member 110. The connecting member 140 may be configured for being connected to a base support, e.g. a luminaire pole. In the exemplary embodiment of FIG. 1 the connecting member 120 has a tubular shape to be connected to a luminaire pole. The connecting member 140 may have an inner diameter larger than an outer diameter of the luminaire pole extremity to be mounted over it, or may have an outer diameter smaller than an inner diameter of the luminaire pole extremity to be mounted within it. The connecting member 140 may be fixed to the base support via a mounting structure 120, a pair of holes in FIG. 1 allowing a pair of bolts passing through a corresponding pair of holes within a base support portion to fix together the connecting member 140 and the base support. A cavity within the connecting member 140 may allow the passage from the base support to the luminaire head of connecting means, e.g. electrical connection, data transmitting wiring, antenna connection, and the like.

The joint member 110 is provided with an outer cylindrical surface section. The outer cylindrical surface section may be shaped as a complete cylindrical surface or a partial cylindrical surface. The outer cylindrical surface section of FIG. 1 is shaped as a partial cylindrical surface whose rotation axis PA does not intersect with the rotation axis CA of the connecting member 140. More particularly, the radius of the outer cylindrical surface section of the joint member 110 is larger than the radius of the connecting member 140. This allows obtaining a large angular arc for the joint member 110 which is advantageous for realizing a reliable mechanical link between the first and second joint portions 100, 200 and a broad angular range of positions through the wide available outer surface area of the joint member 110. Additionally, since the joint member 110 is arranged such that the axis CA of the connecting member 140 is located between the axis PA of the joint member 110 and the outer surface of the joint member 110, the first joint portion 100 of FIG. 1 retains a compact form.

The outer cylindrical surface section of the joint member 110 is provided with a first plurality of interengaging surfaces 113. The interengaging surfaces 113 may be defined as a plurality of surfaces having different angular positioning with respect to each other and/or predetermined roughness, and conceived to cooperate with another corresponding plurality of interengaging surfaces. According to exemplary embodiments, the first and second pluralities of interengaging surfaces 113, 213 may be interengaging teeth as depicted in FIG. 1, interengaging conical elements perpendicular to the cylindrical surfaces, rough surfaces configured for producing a predetermined friction when engaged, three-dimensional elements, and the like. Depending on the characteristics of the interengaging surfaces 113, the obtained angular adjustment of the first plurality of interengaging surfaces with respect to the second has a different precision. It may be an adjustment in steps, or step-less, preferably an adjustment in 5°-steps, more preferably an adjustment in 2.5°-steps.

The first plurality of interengaging surfaces 113 may be provided over the entire angular arc of the outer cylindrical surface section or over a partial angular arc, preferably over the entire angular arc to optimize the range of positions provided by the outer surface area of the joint member 110.

The outer cylindrical surface section of the joint member 110 may extend over at least a 90°-arc, preferably over at least a 180°-arc, more preferably over at least a 300°-arc, most preferably over at least a 140°-arc. The corresponding first plurality of interengaging surfaces 113 may extend over at least a 90°-arc, more preferably over at least a 180°-arc, most preferably over at least a 300°-arc, most preferably over at least a 140°-arc. In an exemplary embodiment, the tiltable joint 1000 may be configured for being adjusted from −10° to 120°, preferably from −10° to 30°, in a post-top configuration of the luminaire head, and for being adjusted from −100° to 30°, preferably from −30° to 30°, in a side-entry configuration of the luminaire head. The characteristics of the surfaces, i.e. shape, material, dimensions, number of interengaging elements, roughness, may be defined according to different requirements, such as precision, contact surfaces, sheer resistance, slippage, and the like.

The first plurality of interengaging surfaces 113 may be made of plastic or metal, preferably steel or aluminum, and may be mounted or integrally formed with the joint member 110. The first plurality of interengaging surfaces 113 may comprise curved surfaces and/or straight surfaces which delimit two-dimensional or three-dimensional interengaging elements profiles. In the exemplary embodiment of FIG. 1, the first plurality of interengaging surfaces 113 comprises a succession of trapezoidal teeth extending along the axis PA of the joint member.

The first plurality of interengaging surfaces 113 may extend along at least two parallel rows of interengaging surfaces 113, two rows on end portions of the joint member 110 in FIG. 1. In another embodiment, the first plurality of interengaging surfaces 113 may extend along one row of interengaging surfaces, preferably on a central portion of the joint member 110. In still another exemplary embodiment, the first plurality of interengaging surfaces 113 may extend over a first and second areas of the joint member 110, said first area corresponding to a first sub-range of the total angular range of the outer cylindrical surface portion, and said second area corresponding to a complementing second sub-range of the total angular range of the outer cylindrical surface portion, optionally overlapping the range of the first sub-range.

The joint member 113 comprises opposing bearings 112a. 112b aligned with its axis PA. The bearings 112a, 112b extend away from the connecting member 140 along the direction of the axis PA. In FIG. 1, the bearings 112a, 112b comprise an inner tubular cavity connected to an inner cavity of the connecting member 140. In another exemplary embodiment, the bearings 112a, 112b may comprise an inner cavity with a polygonal profile. In yet another exemplary embodiment, the bearings 112a, 112b may be connected one to the other through a passage passing through the connecting member 140. In yet another embodiment, the first and second shaft portions 300a, 300b are separately formed and are each provided to their respective bearings 112a, 112b defined each by a blind recess in the external surface of the connecting member 140.

In the embodiment of FIG. 1, a plurality of walls 111a, 111b extends radially along an outer surface of the connecting member 140 between an external surface of the bearings 112a, 112b and a surface of the outer cylindrical surface portion of the joint member 110 opposite the first plurality of interengaging teeth 113. The plurality of walls 111a. 111b may serve as structural reinforcements while keeping minimal the mass and volume of the first joint portion 100.

The first and second shaft portions 300a. 300b may be comprised by a single shaft or by two independent shafts, a single shaft 300 in the embodiment of FIG. 1. The shaft 300 extends through the pair of axially-aligned bearings 112a, 112b along the axis PA. The first and second shaft portions 300a. 300b may rotate around the axis PA such that a pivot is defined. The first and/or second shaft portions 300a, 300b may be cylindrical and extend on either side over a predetermined distance away from the bearings 112a, 112b. In other embodiments, the first and/or second shaft portions may have polygonal, conical or cross profiles extending along the axis of rotation of the shaft portions 300a, 300b. The first and/or second shaft portions 300a. 300b may comprise at least one landing 301a. 301b, a pair of landings 301a, 301b in a plane substantially parallel to the axis PA at both extremities of the shaft 300 in FIG. 1. In another exemplary embodiment, the first and/or second shaft portions 300a. 300b may comprise one landing over part or over the full length of the shaft 300. In yet another exemplary embodiment, the first and/or second shaft portions 300a, 300b may comprise a plurality of landings in a plurality of planes substantially parallel to the axis PA, said planes being at an angle with respect to each other.

Figure 2:
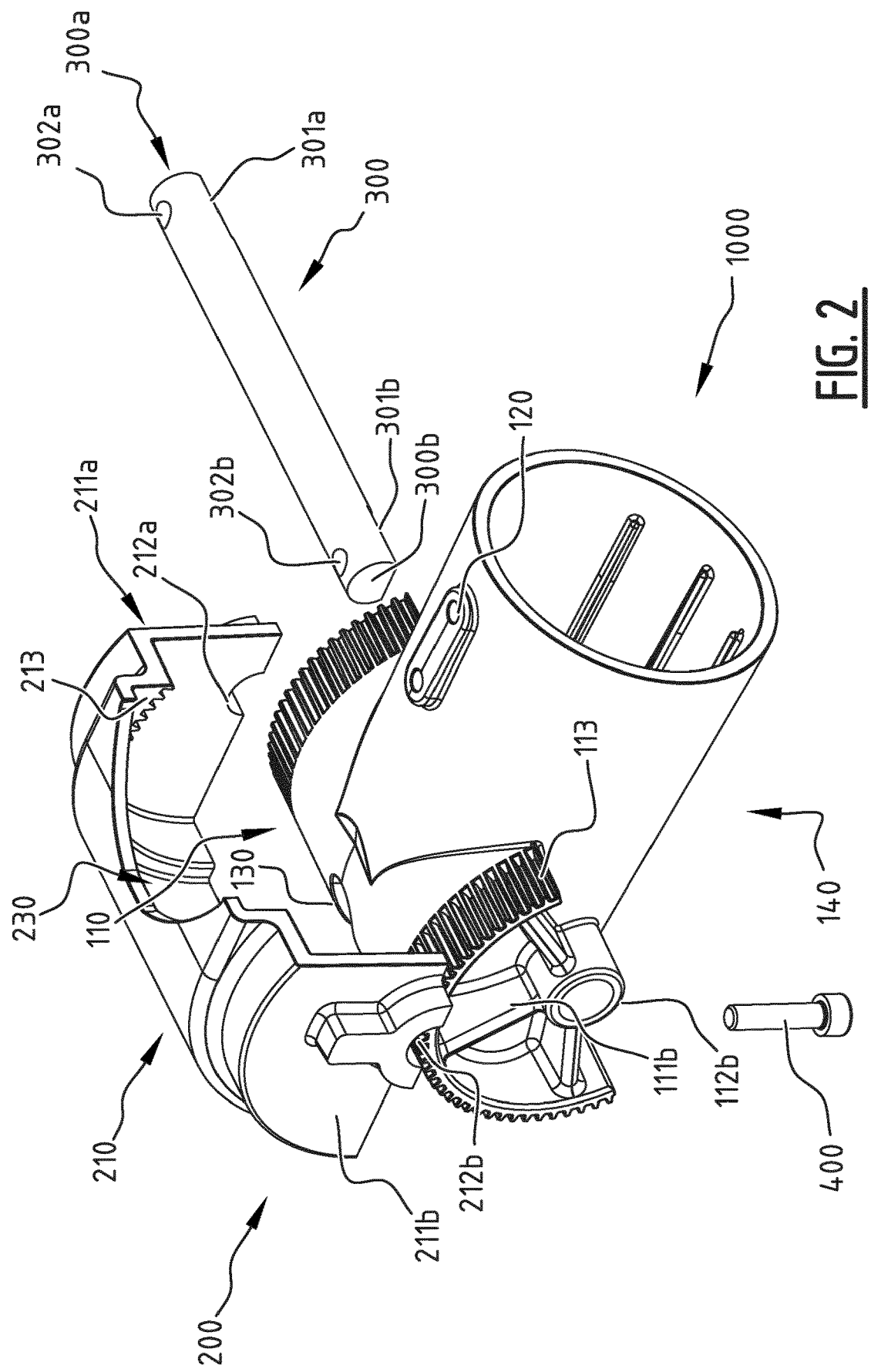
FIG. 2 shows an exploded perspective view of an exemplary embodiment of a tiltable joint for a luminaire.

The second joint portion 200 comprises a joint housing 210 provided with a pair of axially-aligned receiving surfaces 212a, 212b and an inner cylindrical surface provided with a second plurality of interengaging surfaces 213 (not shown but illustrated in FIG. 2). The inner cylindrical surface of the joint housing 210 may extend over an angular arc smaller, larger or substantially equal with respect to the angular arc of the outer cylindrical surface portion of the joint member 110, over a smaller angular arc in FIG. 1. The inner cylindrical surface is provided with the second plurality of interengaging surfaces, a plurality of interengaging teeth in FIG. 1, configured for complementing the first plurality of interengaging surfaces 113. The second plurality of interengaging surfaces may be made of plastic or metal, and be integrally formed or mounted to the inner cylindrical surface. The second plurality of interengaging surfaces may be made in a similar or different material than the first plurality of interengaging surfaces 113. In the embodiment of FIG. 1, the second plurality of interengaging surfaces extends over the entire angular arc of the inner cylindrical surface along two parallel rows. In another embodiment, the second plurality of interengaging surfaces may extend over less than the entire angular arc of the inner cylindrical surface and may be configured to comprise a predetermined amount of contact surfaces when engaged with the first plurality of interengaging surfaces 113.

A plurality of walls 211a. 211b joined to the ends of the inner cylindrical surface may extend away from the inner cylindrical surface of the joint housing 210 towards the rotation axis of the inner cylindrical surface. The plurality of walls 211a. 211b of the joint housing 210 may extend over the plurality of walls 111a. 111b of the joint member 110. The joint housing 210 may be integrally or separately formed with the luminaire head.

The plurality of walls 211a. 211b of the joint housing 210 may comprise the pair of axially-aligned receiving surfaces 212a. 212b. The pair of axially-aligned receiving surfaces 212a. 212b may be located in a plane substantially parallel with the axis PA of the joint member 110. The inner cylindrical surface of the joint housing 210 is configured for being coaxial with the outer cylindrical surface of the joint member 110 when the first and second pluralities of interengaging surfaces 113, 213 are engaged.

The fixation means 400 is configured for fixing the first and second shaft portions 300a, 300b to the second joint portion 200. In the exemplary embodiment of FIG. 1, the fixation means 400 comprises a pair of bolts passing through a pair of apertures (not shown) substantially perpendicular to the axis PA of the first and second shaft portions 300a, 300b and located substantially at their extremities. The bolt heads of the bolts 400 may be supported by a pair of landings 301a, 301b surrounding the pair of apertures of the first and second shaft portions 300a. 300b. Alternatively, the bolts 400 may be stud bolts associated with nuts supported by the pair of landings 301a, 301b.

The first and second shaft portions 300a. 300b may be configured to be received by the pair of receiving surfaces 212a. 212b. A pair of nuts integrally formed within the pair of receiving surfaces 212a, 212b may be utilized to fasten the bolts 400 to the joint housing 210, thereby fixing the first and second shaft portions 300a. 300b to the second joint portion 200 and engaging the first and second pluralities of interengaging surfaces 113, 213.

The fixation means 400 is configured for enabling the engagement of at least a portion of the first plurality of interengaging surfaces 113 with at least a portion of the second plurality of interengaging surfaces 213, and for enabling the release of said engagement such that a rotation movement of the joint housing 210 relative to the joint member 110 is enabled with respect to the pivot axis PA defined by the first and second shaft portions 300a, 300b.

Unfastening the fixation means 400 may allow releasing the engagement of the first and second pluralities of interengaging surfaces 113, 213 while keeping the second joint portion 200 attached to the first and/or second shaft portions 300a. 300b. In this manner, the second joint portion 200 and the first and/or second shaft portions 300a. 300b may be rotated around the axis PA from a first position to a second position of the plurality of positions described by the combined range of the first and second pluralities of interengaging surfaces 113, 213. After rotation and repositioning, the fixations means 400 may be fastened to reengage the first and second pluralities of interengaging surfaces 113, 213. In a preferred embodiment, gravity maintains the engagement of the interengaging surfaces of the first and second joint portions 100, 200 when unfastening the fixation means 400 when the tiltable joint 1000 is mounted to the base support and provided with the luminaire head. The luminaire head may be lifted by an operator to enable the repositioning of the second joint portion 200 with respect to the first joint portion 100.

In an non-illustrated embodiment, the tiltable joint 1000 may further comprise an angular indicator on at least one of the first joint portion 100, second joint portion 200, or the first and/or second shaft portion 300a, 300b. The tiltable joint 1000 may be reliably and precisely arranged at a predetermined position of a plurality of positions for the associated luminaire head to be at a desired angle. The angular indicator may comprise letters, numbers, and/or a scale associated with the plurality of predetermined positions. Optionally, the tiltable joint 1000 may comprise a first angular indicator configured for indicating an angular positioning in a post-top configuration of the luminaire head, and a second angular indicator configured for indicating an angular positioning in a side-entry configuration of the luminaire head.

The first joint portion 100 may comprise an opening 130 configured for enabling a passage of the connecting means (not shown), e.g. electrical connection, data transmitting wiring, antenna connection, and the like, between the first joint portion 100 and the second joint portion 200. The connecting means may be wired through the joint. In a preferred embodiment, the connecting means may pass through a central cavity of the base support. The opening 130 allows maintaining the connecting means within a protected enclosure to connect to the luminaire head. The opening 130 is located in a central portion of the connecting member 140 of the first joint portion 100 in the embodiment of FIG. 1. The opening 130 may extend in a direction perpendicular to the axis of the cylindrical surface of the first joint portion 100 to accommodate for the movement of the connecting means across the range of the plurality of positions. The extent of the connecting means may be adapted to enable for its travel from the closest position of the luminaire head from the opening 130 when attached to the tiltable joint 1000, to its furthest position from the opening 130. Optionally, a removable cap (not shown) may be provided to the opening 130 of the first joint portion 100 in a post-top configuration of the luminaire head such that water ingress through the opening 130 is prevented.

FIG. 2 shows an exploded perspective view of an exemplary embodiment of a tiltable joint for a luminaire according to the present invention. The exemplary embodiment of tiltable joint 1000 of FIG. 2 is similar to the exemplary embodiment of the tiltable joint 1000 of FIG. 1.

The shaft 300 may be mounted to the first joint portion 100 by sliding it through the first (not shown) and the second bearings 112b such that the pair of landings 301a, 301b extends away from the bearings 112b. The pair of apertures 302a, 302b of the shaft 300 are located substantially centrally with respect to the pair of landings 301a, 301b such that the apertures 302a, 302b extends substantially perpendicularly respective to the plane of the landings 301a, 301b.

The shaft 300 is rotated such that the pair of apertures 302a. 302b is arranged opposite to the pair of receiving surfaces 212a. 212b of the second joint portion 200. The second joint portion 200 is arranged over the joint member 110 of the first junction portion 100 such that the housing portion 210 houses the joint member 110. Additionally, the first and second pluralities of interengaging teeth 113, 213 are arranged one above the other. The fixation means 400 is provided through the pair of apertures 302a. 302b and fastened to the integrally formed nuts located in the center of the pair of receiving surfaces 212a, 212b opposite to the pair of landings 301a. 301b. Fastening the fixation means 400 tightly engages the first and second plurality of interengaging teeth 113, 213 and the second joint portion 200 may be immobilized with respect to the first junction portion 100.

The inner cylindrical surface of the second joint portion 200 may comprise a central recess 230 between the parallel rows of the second plurality of interengaging teeth 213. The central recess 230 may extend over the angular range of the second joint portion 200 to provide a passage for the connecting means from the opening 130 of the first joint portion 100 to the luminaire head connected to the second joint portion 200 in the plurality of positions of the second joint portion 200 with respect to the first joint portion 100.

Figure 3:
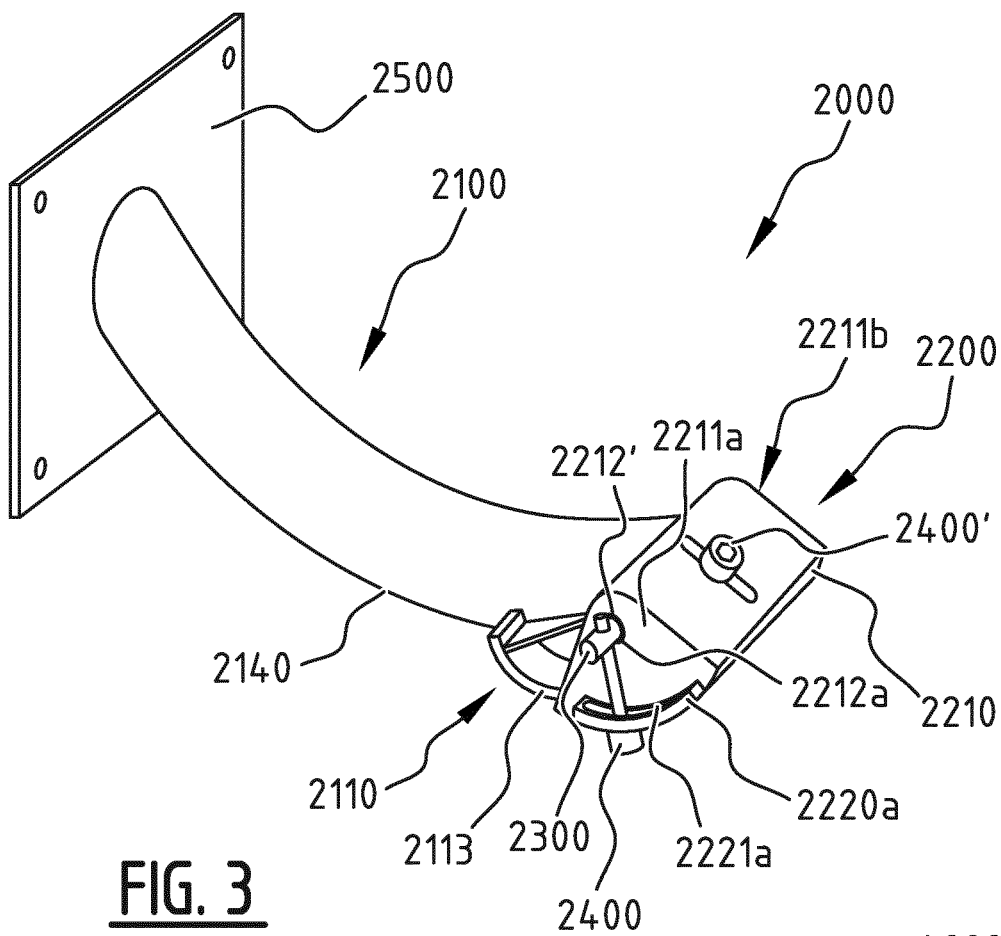
FIG. 3 shows a perspective view of a further exemplary embodiment of a tiltable joint for a luminaire.

FIG. 3 shows a perspective view of a further exemplary embodiment of a tiltable joint for a luminaire according to the present invention. The tiltable joint for a luminaire comprises a first joint portion 2100, a second joint portion 2200, a first and second shaft portions 2300, and a fixation means 2400. Part of the tiltable joint 2000 of FIG. 3 may be included in a housing of a luminaire head or may be connected to the luminaire head in any manner known to the skilled person. The part of the tiltable joint 2000 connected to the luminaire head may be interchangeably the first joint portion 2100 or the second joint portion 2200, preferably the second joint portion 200. The tiltable joint 2000 may be connected via a base support 2500 to a wall or another surface, e.g. for illuminating buildings or tunnels. Other typical examples of luminaires are street lights or sport lights. In the embodiment of FIG. 3 the tiltable joint 2000 is integral with the base support 2500.

The first joint portion 2100 comprises a joint member 2110 provided with an outer cylindrical surface section having an axis and opposite bearings (not shown) aligned with said axis, said outer cylindrical surface section being provided with a first plurality of interengaging surfaces 2113, a first plurality of interengaging teeth in the embodiment of FIG. 2. The tiltable joint 2000 may comprise a base 2500, said base 2500 is configured for being connected to a wall or another surface. The joint member 2110 may be connected to the base 2500 through a connecting member 2140. The joint member 2110 may extend in a direction substantially perpendicular to the main direction of the connecting member 2140.

The second joint portion 2200 comprises a joint housing 2210 provided with a pair of axially-aligned receiving surfaces 2212a, and an inner cylindrical surface provided with a second plurality of interengaging surfaces (not shown). The joint member 2110 of the first joint portion 2100 is configured for being housed within the joint housing 2210 of the second joint portion 2200, and the axis of the pair of axially-aligned bearings is substantially parallel to the axis of the pair of axially-aligned receiving surfaces 2212a.

A plurality of walls 2211a, 2211b joined to the ends of the inner cylindrical surface may extend away from the inner cylindrical surface of the joint housing 2210 towards the rotation axis of the inner cylindrical surface. The plurality of walls 2211a, 2211b of the joint housing 2210 may extend over the sides of the joint member 2110. In the embodiment of FIG. 3, the plurality of walls 2211a, 2211b extends over the bearings of the joint member 2110 and comprises a pair of holes 2212' substantially axially aligned with the bearings. The joint housing 2210 may be integrally or separately formed with the luminaire head.

The first and second shaft portions 2300 may be comprised by a single shaft or by two independent shafts, a single shaft 2300 in FIG. 3. The shaft 2300 extends between the pair of axially-aligned receiving surfaces 2212a, through the pair of axially-aligned bearings, and through the pair of holes 2212' of the joint housing walls 2211a, 2211b, such that a pivot axis is defined. The shaft 2300 of FIG. 3 is a cylinder extending along the main direction of the joint member 2110 and away from the plurality of walls 2211a. 2211b. In other exemplary embodiments, the first and/or second shaft portions 2300 may have polygonal or cross profiles. A pair of apertures (not shown) perpendicular to the axis of the first and second shaft portions 2300a. 2300b are provided at their extremities. The fixation means 2400 may be configured for passing through the pair of apertures. The pair of apertures in the embodiment of FIG. 3 are provided with threads to serve as nuts for fastening the fixation means 2400.

The fixation means 2400 is configured for fixing the first and second shaft portions 2300 to the second joint portion 2200. The fixation means 2400 may comprise a pair of bolts. The plurality of walls 2211a, 2211b of the joint housing 2100 may comprise on each wall 2211a, 2211b a support portion 2220a. The support portions 2220a may extend away from the plurality of walls 2211a. 2211b, following the arc of the outer cylindrical surface portion of the second joint portion 2200. The support portions 2220a may each comprise an elongated hole 2221a in a plane parallel to the inner cylindrical surface of the second joint portion 2200. Each of the elongated holes 2221a may be configured for a bolt to pass through while stopping or blocking the bolt head.

The fixation means 2400 is configured for enabling the engagement of at least a portion of the first plurality of interengaging surfaces 2113 with at least a portion of the second plurality of interengaging surfaces, and for enabling the release of said engagement such that a rotation movement of the joint housing 2210 relative to the joint member 2110 is enabled with respect to the pivot axis defined by the first and second shaft portions 2300.

Passing each of the pair of bolts 400 through the elongated holes 2221a of the support portions 2220a and fastening them to the pair of apertures of the first and second shaft portions 2300 brings together the first and second shaft portions 2300 and the second joint portion 2200. The pair of holes 2212' of the joint housing 2210 are configured to be off-axis with respect to the inner cylindrical surface rotation axis, for the first and second shaft portions 2300 to be received on the inner surfaces, i.e. the receiving surfaces 2212a, of the plurality of holes 2212' when the bolts 400 are tightly fastened and the first and second plurality of interengaging surfaces 2113 engaged.

The second joint portion 2200 is configured for being positioned in a first position of a plurality of positions with respect to the first joint portion 2100. The fixation means 2400 is configured for being unfastened to allow the second joint portion 2200 to be positioned from the first position to a second position of the plurality of positions with respect to the first joint portion 2100. The fixation means 2400 is further configured for being fastened to prevent a movement of the second joint portion 2200 from the second position of the plurality of positions with respect to the first joint portion 2100.

Unfastening the fixation means 2400 may allow releasing the engagement of the first and second plurality of interengaging surfaces 2113 while keeping the second joint portion 2200 attached to the first and/or second shaft portions 2300. In this manner, the second joint portion 2200 and may be rotated around the axis of the first and/or second shaft portions 2300 from a first position to a second position of the plurality of positions described by the combined range of the first and second plurality of interengaging surfaces 2113. In the embodiment in FIG. 3, the shaft 2300 may stay in position while the bolts 2400 slide within the elongated holes 2221a of the support portions 2220a. After rotation and repositioning, the fixation means 2400 may be fastened to reengage the first and second plurality of interengaging surfaces 2113.

In an non-illustrated embodiment, the tiltable joint 2000 may further comprise an angular indicator on at least one of the first joint portion 2100, the second joint portion 2200, or the first and/or second shaft portion 2300. The tiltable joint 2000 may be reliably and precisely arranged at a predetermined position of a plurality of positions for the associated luminaire head to be at a desired angle. The angular indicator may comprise letters, numbers, and/or a scale associated with the plurality of predetermined positions.

The second joint portion 2200 may be further secured with respect to the first joint portion 2100 using another fixation means 2400'. The another fixation means 2400' improves the strength of the mechanical link between the first and second joint portions 2100, 2200. The another fixation means 2400' may be configured for fixing the second joint portion 2200 to the first joint portion 2100 from outside the tiltable joint 2000 to enhance the safety of the engagement and against risk of slippage. In the embodiment of FIG. 3, the another fixation means 2400' comprises a bolt passing through an elongate opening of the joint housing 2210, said elongate opening extending in a direction perpendicular to the shaft portions axis, which may be fastened to the first joint portion 2100. The elongate opening allows the another fixation means 2400' to be fastened to the first joint portion 2100 in the plurality of positions of the second joint portion 2200 with respect to the first joint portion 2100.

Figure 4:
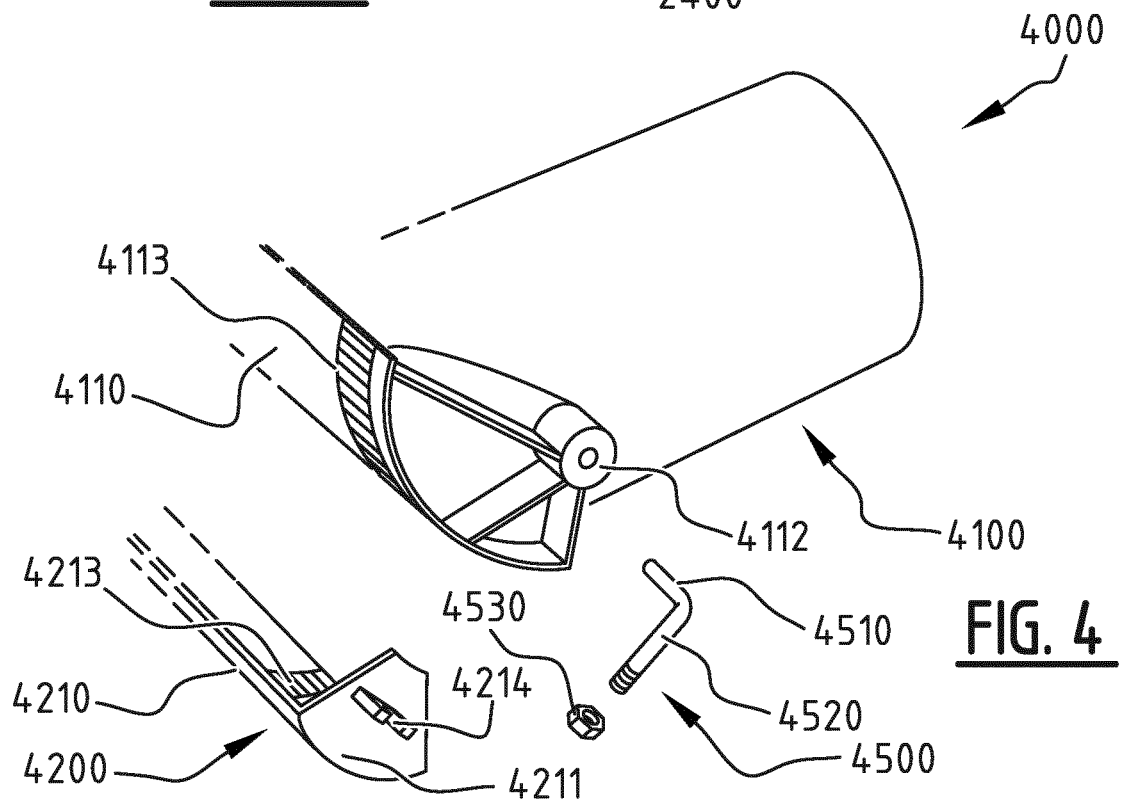
FIG. 4 shows an exploded view of an exemplary embodiment of a tiltable joint for a luminaire.

FIG. 4 shows an exploded view of a further exemplary embodiment of a tiltable joint for a luminaire according to the present invention. The tiltable joint for a luminaire comprises a first joint portion 4100, a second joint portion 4200, a first and second shaft portion 4510, and a fixation means 4520.

The first joint portion 4100 comprises a joint member 4110 provided with an outer cylindrical surface section having an axis and opposite bearings 4112 aligned with said axis, said outer cylindrical surface section being provided with a first plurality of interengaging surfaces 4113. In the embodiment of FIG. 4, each one of the pair of bearing 4112 is provided with a blind hole in its center.

The second joint portion 4200 comprises a joint housing 4210 provided with an inner cylindrical surface provided with a second plurality of interengaging surfaces 4213. The joint member 4110 of the first joint portion 4100 is configured for being housed within the joint housing 4210 of the second joint portion 4200.

A plurality of walls 4211 joined to the ends of the inner cylindrical surface may extend away from the inner cylindrical surface of the joint housing 4210 towards the rotation axis of the inner cylindrical surface. The plurality of walls 4211 of the joint housing 4210 may extend over the sides of the joint member 4110.

The first and second shaft portions 4510 may be comprised by a single shaft or by two independent shafts, a pair of L-shaped elements in FIG. 4. The shorter portion of the L-shaped element forms the shaft portion 4510 and is configured for cooperating with the hole in the center of the bearing 4112 and for being able to rotate within it. The longer portion of the L-shaped element forms a fixation means 4520.

The plurality of walls 4211 of the joint housing 2100 may comprise on each wall 4211 a support portion 4214. The support portions 4214 may extend away from the plurality of walls 4211. The support portions 4214 may each comprise an open ended hole in a plane substantially parallel to the inner cylindrical surface of the second joint portion 4200. Each of the open ended holes may be configured for an L-shaped element to pass through. The extremity of the longer portion of the L-shaped element 4520 may be threaded. A nut 4520 configured for being supported on the support portion 4214 may be fastened to the longer portion of the L-shaped element 4520.

When assembled, fastening the nut 4530 will bring together the first and second pluralities of interengaging surfaces 4113, 4213 to prevent a movement of the second joint portion 4200 with respect to the first joint portion 4100. Unfastening the nut 4530 may allow releasing the engagement of the first and second plurality of interengaging surfaces 4113, 4213 while keeping the second joint portion 4200 attached to the first and second shaft portions 4510. In this manner, the second joint portion 4200 and may be rotated around the axis of the first and second shaft portions 4510 from a first position to a second position of the plurality of positions described by the combined range of the first and second plurality of interengaging surfaces 4113, 4213.

Figure 5A:
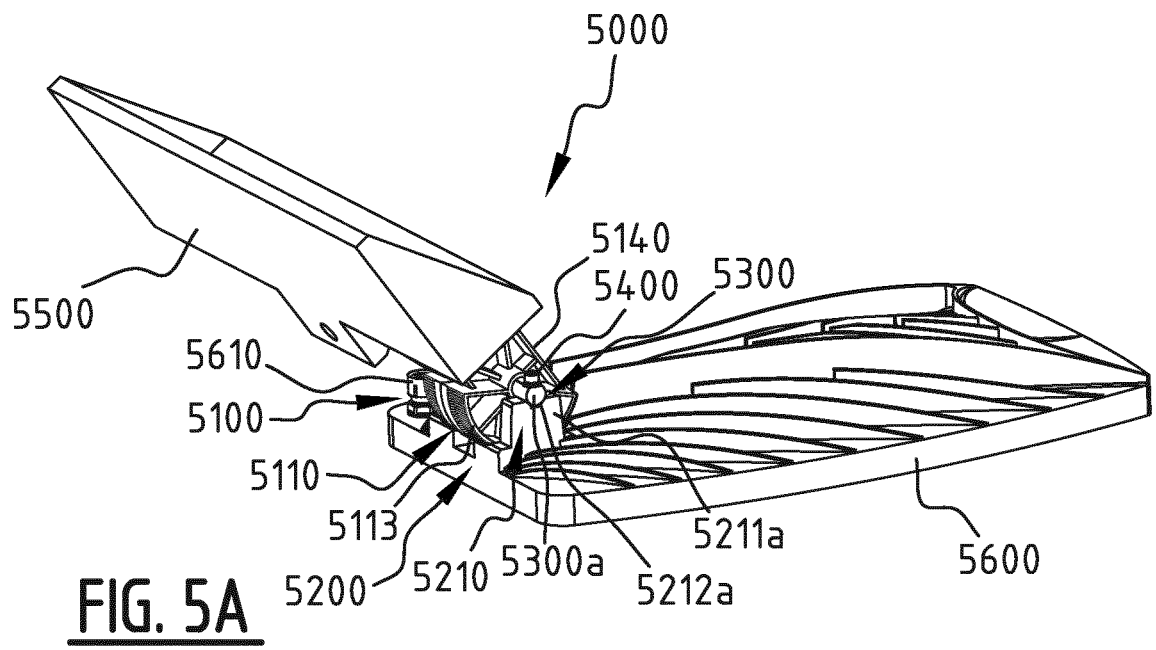
FIGS. 5A-5B show a perspective view and a close-up view, respectively, of another exemplary embodiment of a tiltable joint for a luminaire.
Figure 5B:
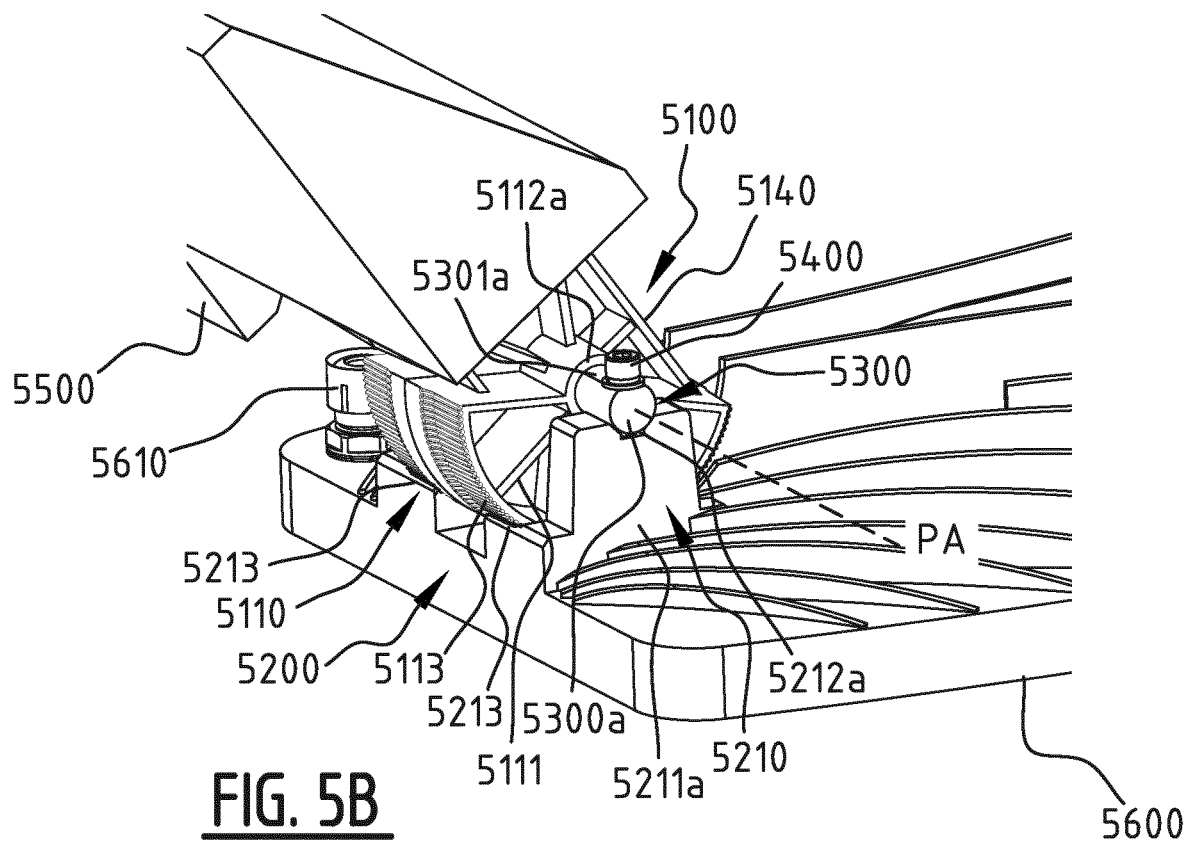

FIGS. 5A-5B show a perspective view and a close-up view, respectively, of another exemplary embodiment of a tiltable joint for a luminaire according to the present invention. The tiltable joint 5000 for a luminaire comprises a first joint portion 5100, a second joint portion 5200, a first shaft portion 5300a, a second shaft portions (not shown), and a fixation means 5400. Part of the tiltable joint 5000 of FIGS. 5A-5B may be included to a housing of a luminaire head 5600 or may be connected to the luminaire head in any manner known to the skilled person. The part of the tiltable joint 5000 connected to the luminaire head 5600 may be interchangeably the first joint portion 5100 or the second joint portion 5200, the second joint portion 5200 in the embodiment of FIGS. 5A-5B. The tiltable joint 5000 may be connected to a base support such as a luminaire pole or a wall to form a luminaire.

Typical examples of luminaires are street lights or sport lights. In the embodiment of FIG. 5A, the tiltable joint 5000 may be connected to a wall or another surface, e.g. for illuminating buildings, tunnels, or stadiums, via a connecting support 5500 comprising the first joint portion 5100. Additionally, the connecting support 5500 may comprise another tiltable joint 5000 for positioning independently another luminaire head 5600.

As illustrated in FIG. 5B the first joint portion 5100 comprises a joint member 5110 provided with an outer cylindrical surface section having an axis of rotation PA and first and second opposing bearings 5112a (only the first is visible) aligned with said axis PA. The joint member 5110 may be connected to a connecting member 5140 extending in a direction substantially perpendicular to the axis PA of the joint member 5110. The connecting member 5140 may be configured for being connected to the connecting support 5500. A cavity within the connecting member 5140 may allow the passage from the connecting support 5500 to the luminaire head 5600 of connecting means, e.g. electrical connection, data transmitting wiring, antenna connection, and the like. Alternatively, the connecting means may pass through a passage away from the connecting member 5140.

The joint member 5110 is provided with an outer cylindrical surface section. The outer cylindrical surface section may be shaped as a complete cylindrical surface or a partial cylindrical surface. The outer cylindrical surface section of FIGS. 5A-5B is shaped as a partial cylindrical surface.

More particularly, the radius of the outer cylindrical surface section of the joint member 5110 is larger than the lateral dimension of the connecting member 5140. This allows obtaining a large angular arc for the joint member 5110 which is advantageous for realizing a reliable mechanical link between the first and second joint portions 5100, 5200 and a broad angular range of positions through the wide available outer surface area of the joint member 5110.

The outer cylindrical surface section of the joint member 5110 is provided with a first plurality of interengaging surfaces 5113 conceived to cooperate with another corresponding plurality of interengaging surfaces 5213. The first and second pluralities of interengaging surfaces 5113, 5213 may be interengaging teeth. Depending on the characteristics of the interengaging surfaces 5113, 5213, the obtained angular adjustment of the first plurality of interengaging surfaces with respect to the second has a different precision. It may be an adjustment in steps, or step-less, preferably an adjustment in steps between 1° and 6°, e.g. an adjustment in 2.5°-steps in the embodiment of FIGS. 5A-5B.

The first plurality of interengaging surfaces 5113 may be provided over the entire angular arc of the outer cylindrical surface section to optimize the range of positions provided by the outer surface area of the joint member 5110. The outer cylindrical surface section of the joint member 5110 may extend over at least a 90°-arc, most preferably over at least a 120°-arc. The corresponding first plurality of interengaging surfaces 5113 may extend over at least a 90°-arc, most preferably over at least a 120°-arc.

The first plurality of interengaging surfaces 5113 may be made of plastic or metal, preferably steel or aluminum, and may be mounted or integrally formed with the joint member 5110. The first plurality of interengaging surfaces 5113 may comprise curved surfaces and/or straight surfaces which delimit two-dimensional or three-dimensional interengaging elements profiles. In the exemplary embodiment of FIGS. 5A-5B, the first plurality of interengaging surfaces 5113 comprises a succession of triangular teeth extending along the axis PA of the joint member.

The first plurality of interengaging surfaces 5113 may extend along at least two parallel rows of interengaging surfaces 5113, two rows on end portions of the joint member 5110 in FIGS. 5A-5B.

The joint member 5113 comprises first and second opposing bearings 5112a (only the first is visible) aligned with its axis PA. The bearings 5112a extend away from the connecting member 5140 along the direction of the axis PA. In FIGS. 5A-5B, the bearings 5112a comprise an inner tubular cavity connecting the bearings 5112a one to the other through a passage passing through the connecting member 5140.

In the embodiment of FIG. 5B, a plurality of walls 5111 extends radially along an outer surface of the connecting member 5140 between an external surface of the bearings 5112a and a surface of the outer cylindrical surface portion of the joint member 5110 opposite the first plurality of interengaging teeth 5113. The plurality of walls 5111 may serve as structural reinforcements while keeping minimal the mass and volume of the first joint portion 5100.

The first and second shaft portions 5300a (only the first is visible) may be comprised by a single shaft 5300. The shaft 5300 extends through the pair of axially-aligned bearings 5112a along the axis PA. The first and second shaft portions 5300a may rotate around the axis PA such that a pivot is defined. The first and second shaft portions 5300a may be cylindrical and extend on either side over a predetermined distance away from the bearings 5112a. The first and second shaft portions 5300a may comprise each one landing 5301a (only the first is visible) in a plane substantially parallel to the axis PA at both extremities of the shaft 5300 in FIG. 5B.

The second joint portion 5200 comprises a joint housing 5210 provided with a first and a second axially-aligned receiving surface 5212a (only the first is visible) and an inner cylindrical surface provided with a second plurality of interengaging surfaces 5213. In the embodiment of FIGS. 5A-5B, the joint housing 5210 may be provided to an external surface of the housing of the luminaire head 5600, e.g. mounted or integrally formed to the housing of the luminaire head.

The inner cylindrical surface of the joint housing 5210 may extend over an angular arc smaller with respect to the angular arc of the outer cylindrical surface portion of the joint member 5110. The inner cylindrical surface is provided with the second plurality of interengaging surfaces 5213, for example a plurality of interengaging teeth configured for complementing the first plurality of interengaging surfaces 5113. The second plurality of interengaging surfaces 5213 may be made of plastic or metal, and be integrally formed to the inner cylindrical surface. The second plurality of interengaging surfaces 5213 may be made in a similar or different material than the first plurality of interengaging surfaces 5113. In the embodiment of FIGS. 5A-5B, the second plurality of interengaging surfaces extends over the entire angular arc of the inner cylindrical surface along two parallel rows.

A first and a second wall 5211a (only the first is visible) joined to the ends of the inner cylindrical surface may extend away from the inner cylindrical surface of the joint housing 5210 and away from the external surface of the housing of the luminaire head 5600, towards the rotation axis of the inner cylindrical surface. The first and second walls 5211a of the joint housing 5210 may extend partially over the plurality of walls 5111 of the joint member 5110.

The first and second walls 5211a of the joint housing 5210 may comprise the first and second axially-aligned receiving surfaces 5212a. The first and second axially-aligned receiving surfaces 5212a may be located in a plane substantially parallel with the axis PA of the joint member 5110. The inner cylindrical surface of the joint housing 5210 is configured for being coaxial with the outer cylindrical surface of the joint member 5110 when the first and second pluralities of interengaging surfaces 5113, 5213 are engaged.

The fixation means 5400 is configured for fixing the first 5300a and second shaft portions to the second joint portion 5200. In the exemplary embodiment of FIGS. 5A-5B, the fixation means 5400 comprises a pair of bolts passing through a pair of apertures substantially perpendicular to the axis PA of the first and second shaft portions 5300a and located substantially at their extremities. The bolt heads of the bolts 5400 may be supported by a pair of landings 5301a surrounding the pair of apertures of the first 5300a and second shaft portions. Alternatively, the bolts 5400 may be stud bolts associated with nuts supported by the pair of landings 5301a.

The first and second shaft portions 5300a may be configured to be received by the first and second receiving surfaces 5212a. A pair of nuts integrally formed within the first and second receiving surfaces 5212a may be utilized to fasten the bolts 5400 to the joint housing 5210, thereby fixing the first and second shaft portions 5300a to the second joint portion 5200 and engaging the first and second pluralities of interengaging surfaces 5113, 5213.

The fixation means 5400 is configured for enabling the engagement of at least a portion of the first plurality of interengaging surfaces 5113 with at least a portion of the second plurality of interengaging surfaces 5213, and for enabling the release of said engagement such that a rotation movement of the joint housing 5210 relative to the joint member 5110 is enabled with respect to the pivot axis PA defined by the first 5300a and second shaft portions.

Unfastening the fixation means 5400 may allow releasing the engagement of the first and second pluralities of interengaging surfaces 5113, 5213 while keeping the second joint portion 5200 attached to the first and/or second shaft portions 5300a. In this manner, the second joint portion 200 and the first and/or second shaft portions 5300a may be rotated around the axis PA from a first position to a second position of the plurality of positions described by the combined range of the first and second pluralities of interengaging surfaces 5113, 5213. After rotation and repositioning, the fixations means 5400 may be fastened to reengage the first and second pluralities of interengaging surfaces 5113, 5213. In a preferred embodiment, gravity maintains the engagement of the interengaging surfaces of the first and second joint portions

5100, 5200 when unfastening the fixation means 5400 when the tiltable joint 5000 is mounted to the base support and provided with the luminaire head. The luminaire head may be lifted by an operator to enable the repositioning of the second joint portion 5200 with respect to the first joint portion 5100.

In an non-illustrated embodiment, the tiltable joint 5000 may further comprise an angular indicator on at least one of the first joint portion 5100, second joint portion 5200, or the first and/or second shaft portion 5300*a*. The tiltable joint 5000 may be reliably and precisely arranged at a predetermined position of a plurality of positions for the associated luminaire head to be at a desired angle. The angular indicator may comprise letters, numbers, and/or a scale associated with the plurality of predetermined positions. Optionally, the tiltable joint 5000 may comprise a first angular indicator configured for indicating an angular positioning in a post-top configuration of the luminaire head, and a second angular indicator configured for indicating an angular positioning in a side-entry configuration of the luminaire head.

In the embodiment of FIGS. 5A-5B, the housing of the luminaire head 5600 comprises an opening 5610 for enabling a passage of the connecting means (not shown), e.g. electrical connection, data transmitting wiring, antenna connection, and the like, between the connecting support 5500 and the luminaire head 5600. In another embodiment, the first joint portion 5100 may comprise an opening configured for enabling the passage of the connecting means between the first joint portion 5100 and the second joint portion 5200. The connecting means may be wired through a seal. The extent of the connecting means may be adapted to enable for its travel from the closest position of the opening 5610 from the connecting support 5500 when the luminaire head 5600 is connected via the tiltable joint 5000, to its furthest position from the connecting support 5500.

FIGS. 6A-6D show multiple views of luminaire embodiments including one or more tiltable joint according to the present invention. The tiltable joint for a luminaire comprises a first joint portion 100, a second joint portion 200, and a first and second shaft portions, parts of a shaft 300 in FIGS. 6A-6D. Part of the tiltable joint may be included in a housing of a luminaire head 600 or may be connected to the luminaire head 600 in any manner known to the skilled person. The part of the tiltable joint connected to the luminaire head 600 may be interchangeably the first joint portion 100 or the second joint portion 200, preferably the second joint portion 200. The tiltable joint may be connected to a base support 700 such as a luminaire pole to form a luminaire. Typical examples of luminaires are street lights or sport lights. In other embodiments, the tiltable joint may be connected to a wall or another surface. The luminaire may be used for illuminating roads, tunnels, industrial plants, stadiums, airports, harbors, rail stations, campuses, parks, cycle paths, pedestrian paths, or pedestrian zones for example.

The shaft 300 defines an axis of rotation PA and may allow positioning of the luminaire head 600 within an operating range a of the tiltable joint. In this manner, a main lighting direction ML of the luminaire head 600 may be modified with respect to the surface to be illuminated. It is to be noted that in FIGS. 6A-6D, the illustrated operating ranges a and a' are not representative of limitative angular ranges but merely serve as indications.

Figure 6A:
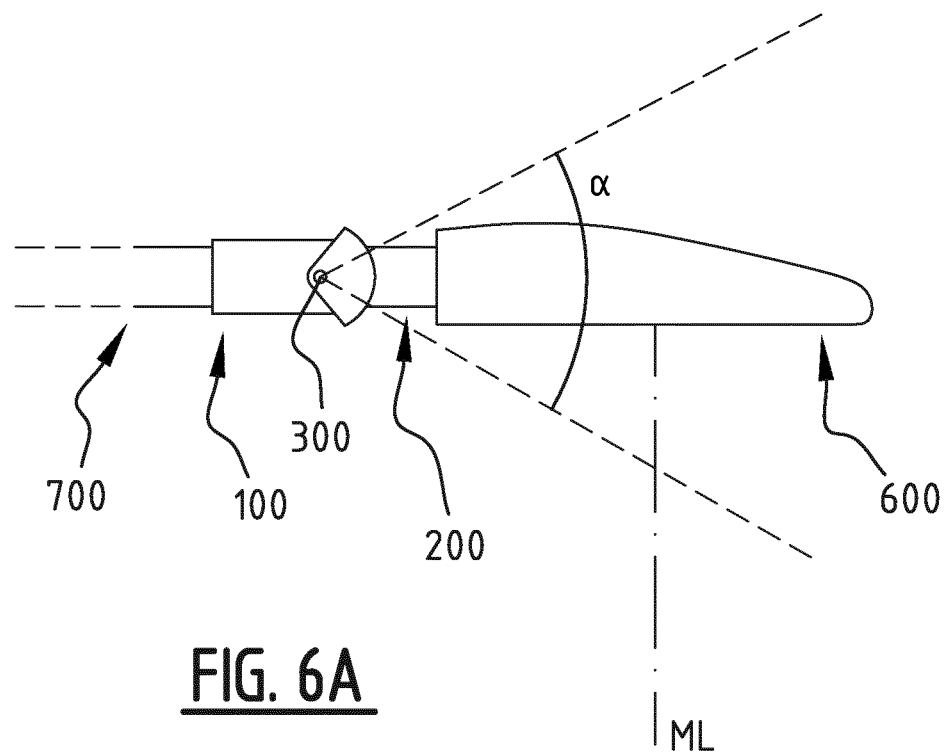
FIGS. 6A-6D show multiple views of luminaire embodiments including one or more tiltable joint according to the invention.
Figure 6B:
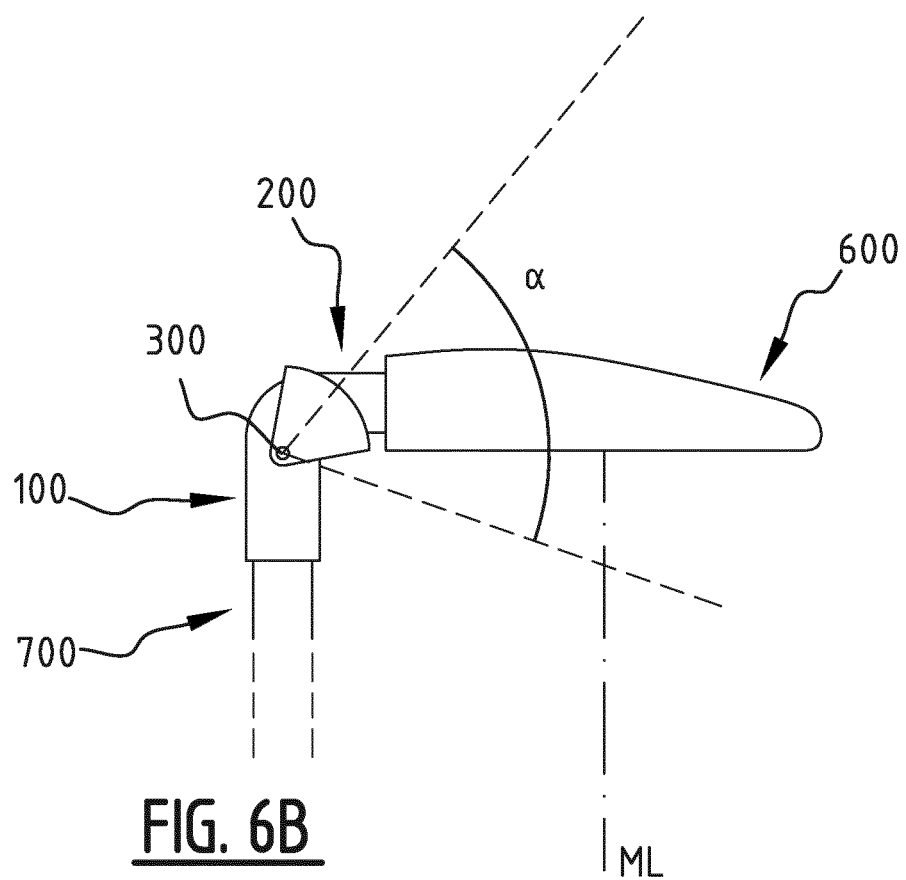

FIGS. 6A and 6B show configurations of the luminaire head 600 respective to the base support 700 commonly known as side-entry and post-top configurations, respectively.

Figure 6C:
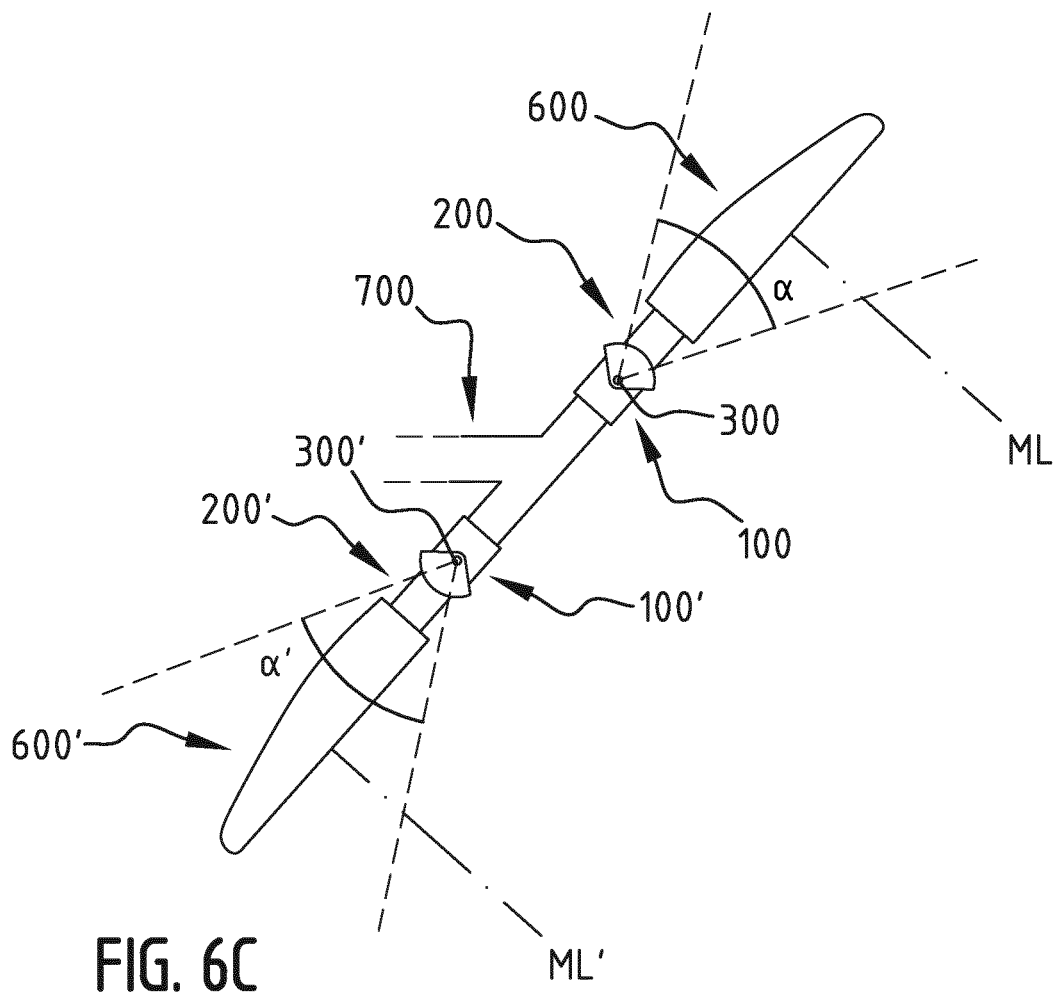

In FIG. 6C, the base support comprises two mounting branches to mount the luminaire head 600 and another luminaire head 600'. The luminaire head 600 and the another luminaire head 600' may be similar or different and emit light in the main lighting direction ML and in another main lighting direction ML', respectively. As illustrated in FIG. 6C, the luminaire head 600 and the another luminaire head 600' may be mounted such that their respective main lighting directions ML, ML' are oblique with respect to the surface to be illuminated. The luminaire head 600 and the another luminaire head 600' may be mounted to their respective mounting branches via respective tiltable joints. For example, the luminaire head 600 may be mounted upwardly, the another luminaire head 600' may be mounted downwardly, and the main lighting directions ML, ML' may be parallel to each other in an initial positioning. The another tiltable joint of the another luminaire head 600' comprises a first joint portion 100', a second joint portion 200', and a first and second shaft portions, parts of a shaft 300'. The tiltable joints of the luminaire head 600 and the another luminaire head 600' may be similar or different. The luminaire head 600 and the another luminaire head 600' may be independently positioned within their respective operating ranges a and a'. Additionally, the base support 700 may be articulated to provide a broader range of positioning of each of its branches, thus providing a broader range of positioning for the luminaire head 600 and the another luminaire head 600'. Additionally or alternatively, the base support 700 may comprise more than two branches, each pointing in similar of different directions, provided each with a corresponding luminaire head.

Figure 6D:
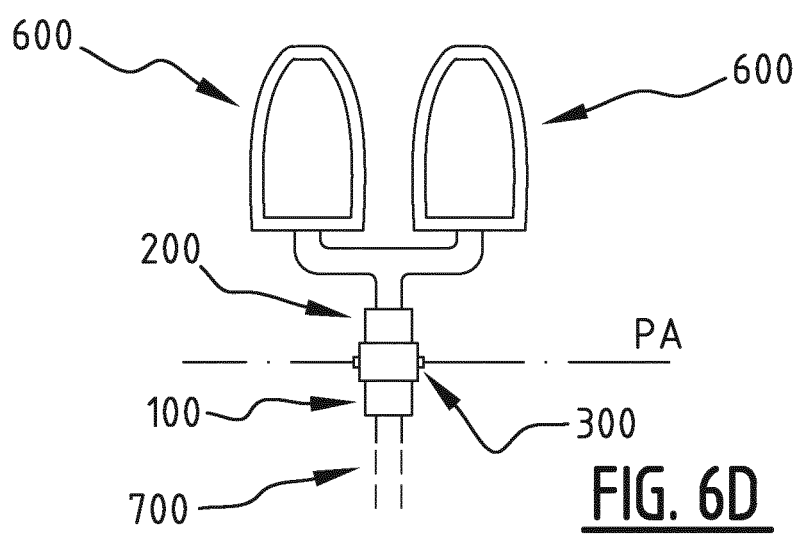

In FIG. 6D, two luminaire heads 600 are coupled via a Y-connector and connected to the second joint portion 200. In this way, the luminaire heads 600 may be commonly positioned using a single tiltable joint. In another embodiment, a plurality of luminaire heads 600 forming a subset may be organized in rows and/or columns and be commonly positioned using a tiltable joint according to the invention; a plurality of said subsets may define a luminaire including an array of luminaire heads. Additionally or alternatively, some or all of the luminaire heads in the array may be independently positionable via a dedicated tiltable joint according to the invention.

Whilst the principles of the invention have been set out above in connection with specific embodiments, it is to be understood that this description is merely made by way of example and not as a limitation of the scope of protection which is determined by the appended claims.

The invention claimed is:

1. A tiltable joint for a luminaire, the joint comprising:
   a first joint portion comprising a joint member provided with an outer cylindrical surface section and a pair of axially-aligned opposing bearings, said outer cylindrical surface section being provided with a first plurality of interengaging surfaces;
   a second joint portion comprising a joint housing provided with an inner cylindrical surface provided with a second plurality of interengaging surfaces configured to interengage the first plurality of interengaging surfaces,
   wherein the joint member of the first joint portion is configured for being housed within the joint housing of the second joint portion;
   first and second shaft portions extending in alignment with the pair of axially-aligned opposing bearings, such that a pivot axis, PA, is defined; and
   a coupling means configured for:

coupling the first and second shaft portions to the second joint portion;
enabling the engagement of at least a portion of the first plurality of interengaging surfaces with at least a portion of the second plurality of interengaging surfaces; and
enabling the release of said engagement such that a rotation movement of the joint housing relative to the joint member is enabled with respect to the pivot axis defined by the first and second shaft portions,
wherein the coupling means comprises a threaded portion and a nut,
wherein a first threaded portion of the coupling means and the first shaft portion are comprised by a first L-shaped element, and
wherein a second threaded portion of the coupling means and the second shaft portion are comprised by a second L-shaped element.

2. The tiltable joint according to claim 1, wherein the second joint portion is configured for being positioned in a first position of a plurality of positions with respect to the first joint portion,
wherein the coupling means is configured for being unfastened to allow the second joint portion to be positioned from the first position to a second position of the plurality of positions with respect to the first joint portion, and
wherein the coupling means is further configured for being fastened to prevent a movement of the second joint portion from the second position of the plurality of positions with respect to the first joint portion.

3. The tiltable joint according to claim 1, wherein the coupling means extends radially with respect to the pivot axis defined by the first and second shaft portions, and wherein the coupling means extends through the first and second shaft portions.

4. The tiltable joint according to claim 1, wherein the joint housing of the second joint portion is further provided with a pair of axially-aligned support portions configured for being coupled to the coupling means.

5. The tiltable joint according to claim 4, wherein the first and/or the second shaft portion comprises a landing opposite the axially-aligned support portion, and wherein the fixation means is further configured for enabling the engagement by bringing the landing closer to the support portion.

6. The tiltable joint according to claim 4, wherein the support portions extend following the arc of the outer cylindrical surface portion of the second joint portion.

7. The tiltable joint according to claim 4, wherein the support portions each comprise an elongate hole in a plane parallel to the inner cylindrical surface of the second joint portion.

8. The tiltable joint according to claim 1, wherein a shaft comprises the first and second shaft portions.

9. The tiltable joint according to claim 1, wherein the first and second pluralities of interengaging surfaces are a first and second pluralities of interengaging teeth, respectively.

10. The tiltable joint according to claim 1, further comprising an angular indicator on at least one of the first joint portion, the second joint portion, the first shaft portion, or the second shaft portion.

11. The tiltable joint according to claim 1, wherein one of the first or second plurality of interengaging surfaces extends over an angular arc larger than the other one of the first or second plurality of interengaging surfaces.

12. The tiltable joint according to claim 1, wherein the first plurality of interengaging surfaces and the second plurality of interengaging surfaces extend over a centrally positioned area of the first joint portion and the second joint portion, respectively.

13. The tiltable joint according to claim 1, wherein the first joint portion further comprises a mounting structure configured for mounting the first joint portion to a base support.

14. The tiltable joint according to claim 1, further comprising a passage for a connecting means between the first joint portion and the second joint portion.

15. The tiltable joint according to claim 14, wherein the outer cylindrical surface section is provided with an opening creating said passage.

16. The tiltable joint according to claim 1, further comprising another fixation means configured for fixing the second joint portion to the first joint portion.

17. A luminaire system assembly comprising:
a base support;
the tiltable joint according to claim 1; and
a luminaire head,
wherein the tiltable joint is configured for connecting the base support and the luminaire head.

18. The luminaire system assembly according to claim 17, wherein the base support comprises a support pole.

19. A tiltable joint for a luminaire, the joint comprising:
a first joint portion comprising a joint member provided with an outer cylindrical surface section and a pair of axially-aligned opposing bearings, said outer cylindrical surface section being provided with a first plurality of interengaging surfaces;
a second joint portion comprising a joint housing provided with an inner cylindrical surface provided with a second plurality of interengaging surfaces configured to interengage the first plurality of interengaging surfaces,
wherein the joint member of the first joint portion is configured for being housed within the joint housing of the second joint portion,
wherein the joint housing of the second joint portion is further provided with a pair of support portions configured for supporting a coupling means, and
wherein the support portions extend substantially parallel to the arc of the outer cylindrical surface portion of the second joint portion; and
first and second shaft portions extending in alignment with the pair of axially-aligned opposing bearings, such that a pivot axis, PA, is defined,
wherein the coupling means is configured for:
coupling the first and second shaft portions to the second joint portion;
enabling the engagement of at least a portion of the first plurality of interengaging surfaces with at least a portion of the second plurality of interengaging surfaces; and
enabling the release of said engagement such that a rotation movement of the joint housing relative to the joint member is enabled with respect to the pivot axis defined by the first and second shaft portions.

20. A tiltable joint for a luminaire, the joint comprising:
a first joint portion comprising a joint member provided with an outer cylindrical surface section and a pair of axially-aligned opposing bearings, said outer cylindrical surface section being provided with a first plurality of interengaging surfaces;
a second joint portion comprising a joint housing provided with an inner cylindrical surface provided with a second plurality of interengaging surfaces configured to interengage the first plurality of interengaging surfaces, wherein the joint member of the first joint portion is configured for being housed within the joint housing of the second joint portion, wherein the joint housing of the second joint portion is further provided with a pair of support portions configured for supporting a coupling means, and wherein the support portions each comprise an elongate hole in a plane parallel to the inner cylindrical surface of the second joint portion; and first and second shaft portions extending in alignment with the pair of axially-aligned opposing bearings, such that a pivot axis, PA, is defined, wherein the coupling means is configured for:
  coupling the first and second shaft portions to the second joint portion;
  enabling the engagement of at least a portion of the first plurality of interengaging surfaces with at least a portion of the second plurality of interengaging surfaces; and
  enabling the release of said engagement such that a rotation movement of the joint housing relative to the joint member is enabled with respect to the pivot axis defined by the first and second shaft portions.

* * * * *